Sept. 14, 1965 H. L. BARNEY 3,206,559

ECHO SUPPRESSOR FOR CIRCUIT WITH LONG DELAY

Filed April 11, 1961 3 Sheets-Sheet 1

INVENTOR
H. L. BARNEY DECEASED
SARA E. BARNEY
HIS EXECUTRIX
BY
G. E. Hirsch Jr.
ATTORNEY INVENTOR
H. L. BARNEY DECEASED
SARA E. BARNEY
HIS EXECUTRIX
BY
G. E. Hirsch Jr.
ATTORNEY

ECHO SUPPRESSOR FOR CIRCUIT WITH LONG DELAY

Filed April 11, 1961 3 Sheets-Sheet 3

INVENTOR
H. L. BARNEY DECEASED
SARA E. BARNEY
HIS EXECUTRIX
BY
G. E. Hirsch, Jr.
ATTORNEY United States Patent Office 3,206,559
Patented Sept. 14, 1965

3,206,559
ECHO SUPPRESSOR FOR CIRCUIT WITH LONG DELAY

Harold L. Barney, deceased, late of Madison, N.J., by Sara E. Barney, executrix, Madison, N.J., assignor to Bell Telephone Laboratories, Incorporated, New York, N.Y., a corporation of New York
Filed Apr. 11, 1961, Ser. No. 102,321
11 Claims. (Cl. 179—170.2)

This invention relates to the suppression of echoes in communication channels and more particularly to the effective suppression of echoes in a two-way telephone circuit of extremely long and variable path length such as, for example, a circuit completed by way of an active or passive space satellite of the earth. Its principal object is to coordinate the suppression of echoes that may be produced in such a communication channel with the time at which echoes are encountered at the point of suppression.

In two-way telephone circuits, it is common practice to interconnect local 2-wire circuits, such as subscriber lines, by an arrangement known as a hybrid which directs outgoing signals over one channel and accepts incoming signals from another. The transition from the two unidirectional paths to one bidirectional path often gives rise to echoes or reflected transmissions. It is the usual practice to minimize such echo transmissions by means of signal-controlled apparatus which effectively disables one of the unidirectional paths while signal transmission is taking place over the other. Thus, echo signals are prevented from being transmitted back to the originating end and causing either a disturbance or singing. The disabling apparatus usually comprises means, such as an amplifier-detector control circuit, for diverting a portion of the signal from one path and utilizing it to control the open circuiting or short-circuiting of the oppositely directed path or to control the operational characteristics of an amplifier or attenuator in the oppositely directed path.

Transmission delay in a telephone circuit that has a very long transmission path such as, for example, a circuit completed by way of reflections from another planet or from a space satellite of considerable altitude, is a far more serious problem that it is in ordinary long distance circuits. In a circuit with relatively short delay, much of the echo is masked by a side tone the perceptual effects of which persist for a short interval after an utterance. However, if echoes are produced and are returned to the transmitting station after a quarter of a second or more, they are more easily perceived, and their amplitudes must be reduced to near threshold. This puts a much more stringent requirement on both the sensitivity of the echo detection apparatus and on the amount of loss that must be introduced in a transmission circuit by a suppressor.

If the echo suppressors for both of the one-way transmission circuits are placed at one or the other of the two terminal stations but not at both, echoes arising at the station remote from the suppressor location are returned to the speaker after a time equal to twice the delay of the transmission path. Although such an arrangement is often desirable and in some cases is an engineering necessity, it compounds the difficulties outlined above since the echo suppressor is out of synchrony with the echo return by a time interval of 2D seconds, where 2D denotes the total roundtrip delay. Thus, the suppressor will operate 2D seconds before echoes reach it, and will release upon cessation of speech even though echoes are "stored" in the transmission path for substantially the period 2D. This situation is generally alleviated by delaying the operation of the suppressor in the return path for a period equal to twice the total path delay.

In a satellite communication system the transmission delay is a function of the orbit altitude. If the satellite is accurately placed in an equatorial orbit at approximately 23,000 miles it will remain virtually stationary with respect to ground stations so that although the delay imparted to a signal is relatively long, on the order of 0.6 second, ordinary echo suppressors can deal with the problem. With all other altitudes and orbits, however, the delay is not only long but may vary from time to time as the position of the satellite changes with respect to the citus of the associated radio transmitter and receiver stations. Moreover, if a number of satellites are employed at various locations in synchronized orbits, substantial jumps in delay may be encountered as tracking of one satellite is discontinued and tracking of another in a more favorable position is commenced. This delay jump can be as great as several milliseconds and although not of serious consequence on telephone circuits, might be quite objectionable on circuits carrying data signals. If ordinary echo suppressors are used in any of the less perfect, but perhaps more practical satellite systems, echoes will regularly find a closed path to their point of origin. More seriously, however, erratic suppressor operation will increase rather than diminish the occurrence of transmission lock-out. Irrespective of its origin, a variation in transmission time delay, either in discrete jumps or in a slowly varying fashion, makes for abnormal transmission in which interruptions and general confusion are the rule rather than the exception.

It is a specific object of the present invention to improve the quality of speech signals transmitted by way of a space satellite by eliminating echoes and the speech mutilation, lock-out, and confusion that follow from their presence. This object is attained in accordance with the invention by continuously coordinating the operation of an echo suppressor with the momentary transmission path length. Both the so-called attack time, that is, the moment at which a suppressor becomes effective to block echo transmission, and hangover time, that is, the period during which a suppressor remains active after the cessation of speech to block echoes "stored" in the transmission path, are made variable and placed under control of a program established by the position coordinates of the satellite. Since transmission delay time is a function of transmission path length, sufficient information for maintaining suppressor synchronization is found in range data derived, for example, from radar apparatus used at a satellite tracking station. These data are used with the aid of a servo mechanism to alter the period of delay of apparatus in circuit connection with the suppressor elements. Typically, a tape record-reproduce mechanism in which the relative spacing of the record and pick-up heads about a revolving magnetic drum is employed.

While the invention is particularly well suited to use in a terminal suppressor arrangement, it is also applicable to centrally located suppressor arrangements used, for example, between two satellite circuits connected in tandem.

The invention will be more fully apprehended from the following detailed description of preferred embodiments thereof taken in connection with the appended drawings in which:

FIG. 1 is a block schematic diagram showing a two-way satellite communication system including a terminal echo suppressor constructed in accordance with the in- in which:

FIG. 1A is a diagram showing trigonometric relation helpful in explaining the apparatus of FIG. 1;

In the interests of simplicity, the circuit diagrams to be discussed are presented, for the most part, in block schematic form, with single-line paths which direct the flow of energy and information to the several apparatus components which process it. This rule is departed from in a few individual instances where the inclusion of electric input terminals and output terminals appears to add to the clarity of the exposition. It is to be understood that, in practice, each single-line energy path will normally be actualized with two electric conductors, one of which may in many cases be connected to ground.

Figures 1, 1A:
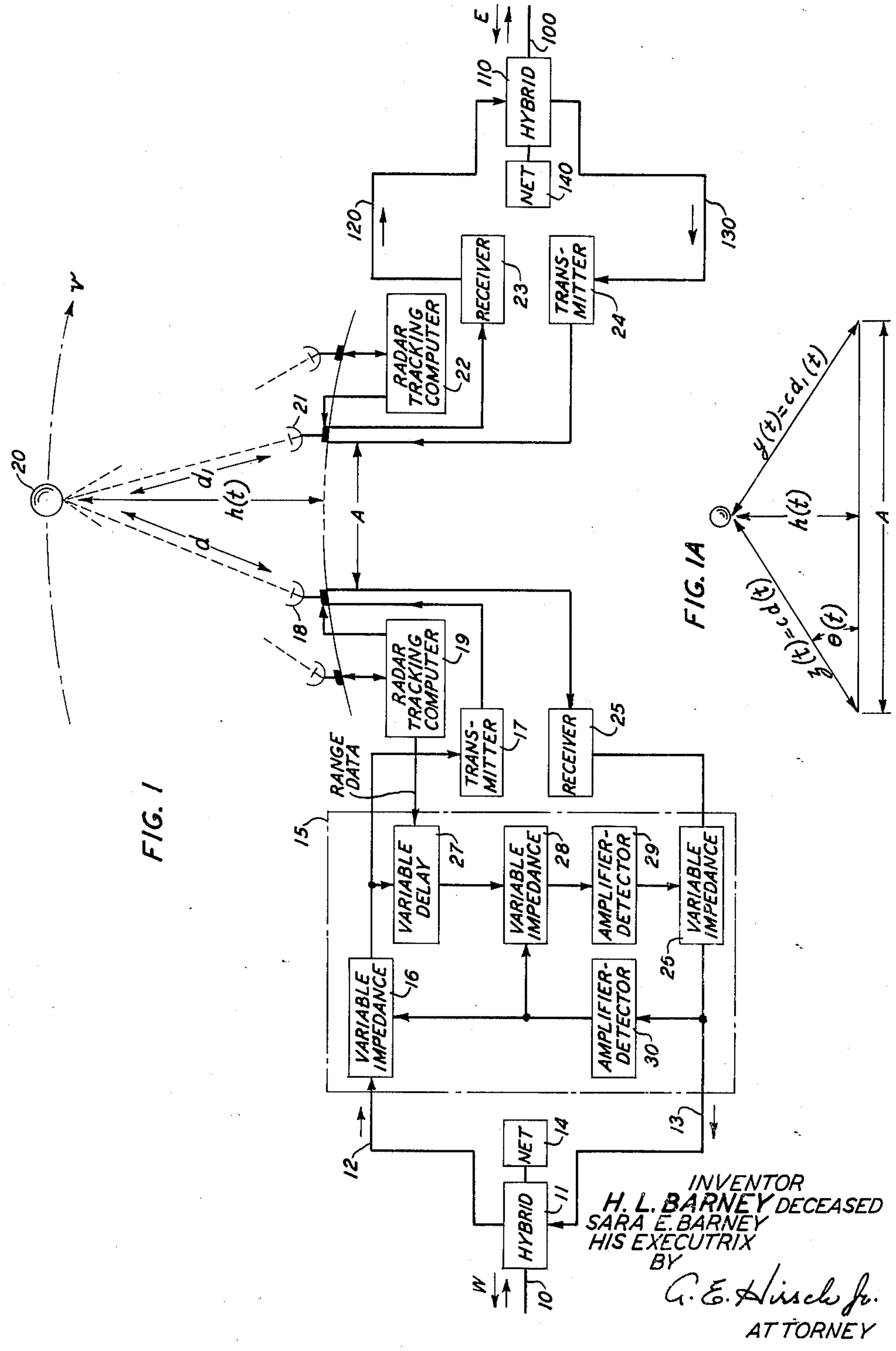

FIG. 1 illustrates by way of a greatly simplified diagram a space satellite communication system interconnecting two terminal stations designated respectively E (East) and W (West). Two-way transmission is carried out in the following manner. A local circuit 10, which typically is a conventional 2-wire telephone circuit connecting a subscriber to station W, is connected by hybrid network 11 to one end of a 4-wire system that includes two separate 2-wire circuits 12 and 13. In well known fashion, the hybrid network provides a one-way path for voice currents from circuit 10 to outgoing circuit 12 and another one-way path for incoming currents from circuit 13 to local circuit 10. The impedance of the local circuit 10 is matched by a balancing network 14 associated with hybrid 11.

Outgoing currents in circuit 12 are passed by way of a variable impedance 16 in suppressor apparatus 15 to radio transmitter 17. Modulated radio frequency signals are then directed by way of antenna 18 under the control of a tracking computer 19 to a reflective surface in space, e.g., a satellite 20 in an orbit $h(t)$ miles above the earth. Reflections of the radio signals are captured by antenna 21, located near the East subscriber station, which tracks the satellite under the guidance of a computer 22. Incoming signals are supplied to receiver 23 wherein the voice frequency signals are recovered and passed by way of circuit 120 to hybrid network 110 and ultimately to subscriber circuit 100. The transmission medium may, of course, include several satellite repeater links, a long line transmission system such as an underseas cable, or a relatively long haul microwave system. At the East subscriber station, hybrid network 110, terminated by network 140, transfers incoming signal currents from circuit 120 to subscriber circuit 100 and routes locally generated signals from circuit 100 to outgoing circuit 130. Outgoing currents are passed to radio transmitter 24 and, as radio frequency signals, to antenna 21 where they are directed toward satellite 20. Reflections of these signals are captured by antenna 18 at the West subscriber station and passed by way of radio receiver 25 and variable impedance 26 to circuit 13 coupled to hybrid 11.

Ideally, all incoming currents are passed to a subscriber line; none is transferred to the outgoing circuit. Unfortunately, a small portion of the incoming wave is passed through the hybrid and returned to the remote station as an echo. If of sufficient magnitude, echo currents may circulate repeatedly around the loop causing considerable annoyance to the subscribers at both ends and possibly causing singing. Accordingly, echo suppressor apparatus 15 is included in the transmission system, preferably at one or the other of the terminal stations only. In the example illustrated, it is located near the West terminal station. It includes variable impedance 16 in signal path 12, variable impedance 26 in path 13, and variable impedance 28 in the control path of impedance 26. Impedances 16, 26 and 28 may be variable gain amplifiers, variolossers, or switching elements designed effectively to open-circuit or short-circuit the signal path to any desired degree in response to external stimulus.

An outgoing signal from station W via path 12 ordinarily passes without attenuation through impedance 16 directly to transmitter 17. It also is passed by way of delay element 27 and variable impedance 28 to amplifier-detector 29. Amplifier-detector 29, which may be of any desired construction, responds to speech signals whose magnitudes exceed a pre-established threshold, rectifies athe signals and supplies at its output a control signal of suitable form for altering the transmission characteristic of variable impedance 26. The exact construction of detector 29 depends, of course, on the specific form of variable impedance utilized. Thus, speech signals in path 12 are effective to alter the impedance characteristic of device 26 thus to block the passage of signals in path 13. If subscriber E is speaking, and subscriber W is not, then subscriber E's speech signals are passed from receiver 25 through impedance 26 to hybrid 11 and the West subscriber line 10. E's signals also activate amplifier-detector 30 to alter the impedance characteristic of impedance 16 thus to block transmission in path 12.

During transmission from E to W, echo suppression is provided by amplifier-detector 30 operating suppressor element 16. In order to prevent E–W transmission from being suppressed by speech signals that may have been stored in variable delay 27 before suppressor element 16 operates, an additional suppressor element 28, e.g., a variable impedance, is provided which disables amplifier-detector 29 at a point following the delay.

With this simplified suppressor arrangement it is evident that one subscriber can occasionally cause the speech of the other to be interrupted, i.e., only one one-way conversation may normally take place at one time. The situation in which both communication paths are simultaneously disconnected (or locked out) generally cannot occur. For example, if W starts talking D seconds before E (where D represents the total path delay between stations or $(d+d_1)$ in FIG. 1) the respective speech signals reach the inputs of detectors 29 and 30 simultaneously and control of the circuit is indeterminate. However, if W starts talking $D\pm\Delta$ seconds before E, where $\Delta$ is a very short time on the order of milliseconds, control of the circuit will be gained by whichever of the E or W signals reaches its respective amplifier-detector input first and there will be no mutual disconnection, or lock out, as may occur in the so-called split suppressor arrangement. Further improvement may be made by using a form of differential detection, well known in the art, to ascertain at each moment which of the two subscribers is speaking the loudest and thus signifies the greater desire for a speech path.

With the extremely long delay occasioned by the satellite path, echo return is delayed by the instantaneous magnitude of the period $2(d+d_1)$. Thus, if W's speech instantaneously blocks E's speech path, suppression will unnecessarily anticipate the moment of echo return by substantially the period $2(d+d_1)$. Similarly, if upon cessation of W's speech the block is removed from path 13 instantaneously, echoes stored in the transmission path will persist for a period $2(d+d_1)$, and will be heard by W.

These difficulties are overcome in the present invention by coordinating the operation of suppressor impedance 26 with the period during which echoes may be returned to the West substation. Accordingly, variable delay device 27 is continuously adjusted so that the operation of suppressor element 26 is synchronized with the period during which echoes may be present; i.e., both the moments at which suppressor action begins and ceases are synchronized with the time of probable echo return. Variable delay device 27 is adjusted to match the total delay of W's speech in traveling from transmitter 17 to station E and, as an echo, to receiver 25, e.g., a roundtrip delay of $2(d+d_1)$. If the satellite altitude and orbit are known precisely, the instantaneous delay is easily computed. Radar measurements from both substations communicated to computer 19 by a land line, for example, are sufficient. Alternatively, a measure of total delay may be made solely from information available at either tracking station.

Consider, for example, the apparatus of FIG. 1 wherein all measurements are made at the West station. The time varying range $z(t)$ of the satellite from station W, and the time varying elevation angle $\theta(t)$ are measured by the W radar. The velocity of electromagnetic radio waves in space $c$, and the distance A between substations are known constants. Hence, by a simple trigonometric relation (see FIG. 1A), the time varying range $y(t)$ of the satellite from station E may be found from the following equation:

$$y=(z^2+A^2-2Az\cos\theta)^{1/2} \quad (1)$$

The roundtrip distance is thus $2(z+y)$ and the roundtrip delay is simply $$2D=2(d+d_1)=2\left(\frac{z+y}{c}\right) \quad (2)$$

All of the required data are generally available from the satellite tracking station radar apparatus. This equipment, which in itself forms no part of the present invention, is symbolized by an antenna and computer at each substation; namely, antenna 31 and radar tracking computer 19 at the West station, and antenna 32 and computer 22 at the East station.

Apparatus whose delay is adjustable and a function of a continuously variable control signal is well known in the art. Since time variations in satellite altitude are slow as compared with the syllabic rate of speech, delay adjustment presents no unusual problems. Suitable apparatus may, for example, comprise a lumped constant delay line and an electronically variable section, but preferably it comprises tape record-reproduce apparatus including a rotatable drum and means for altering the relative distance between the record and pick-up heads. This adjustment may be made conveniently by physically moving the heads about the periphery of the drum or by altering the speed of rotation of the drum.

Figure 2:
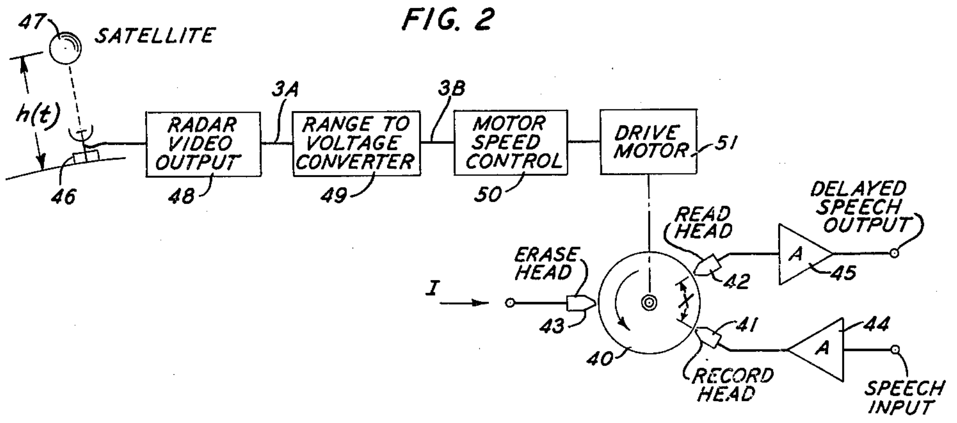
FIG. 2 is a block schematic diagram showing variable delay apparatus under control of range data satisfactory for use in the practice of the invention.
Figure 3:
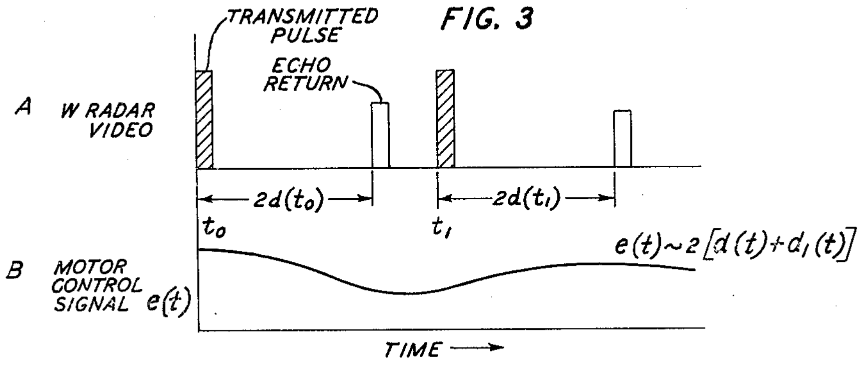
FIG. 3 is a pair of wave forms illustrative of the operations carried out by various apparatus components of FIG. 2.

Suitable delay equipment is illustrated in FIG. 2. A rotating magnetic drum 40 has located about its periphery record head 41, pick-up head 42 and erase head 43. Speech signals, for example, from variable impedance 16 in path 12 of the apparatus of FIG. 1, are applied by way of amplifier 44 to the record head 41 where they are stored on the surface of the drum. After drum rotation, the information is read out by pick-up head 42 and supplied by way of amplifier 45 to variable impedance 28 in the apparatus of FIG. 1. Following an additional degree of drum rotation, the recorded information is erased thus to eliminate multiple reproductions of the same signal and to insure subscriber privacy. The degree of delay afforded by this apparatus is a function of drum velocity and the spacing of the pick-up and record heads. Thus the required relation between the two may be found directly from data available at a radar tracking station 46. Echo signals returned from a satellite 47 are supplied to radar apparatus 48 which provides at its output video signal information proportional to the momentary range of the satellite. Typically, pulse pairs of the form shown in FIG. 3*a* are used to derive this information. The range data is converted in apparatus 49 into a unipolar voltage whose magnitude is proportional to a delay $2d$. If required, the necessary trigonometric conversions may be applied in order to convert this signal to one proportional to the momentary roundtrip delay of the communications channel, i.e., $2(d+d_1)$. A typical unipolar control signal is shown in FIG. 3*b*. This signal is used to energize motor speed control apparatus 50 of any desired sort which in turn activates drum drive motor 51. Alternatively, the output of motor speed control 50 may be used to energize a mechanism for physically altering the spacing between the record and read heads 41 and 42.

The relation between drum velocity and head spacing may be easily computed from the total speech delay as follows:

$$v(t)=\frac{x}{2D}=\frac{xc}{2(z+y)} \quad (3)$$

where $x$ is the peripheral distance between the record and pick-up heads and $v(t)$ is the time variable velocity of the magnetic drum.

Figure 4:
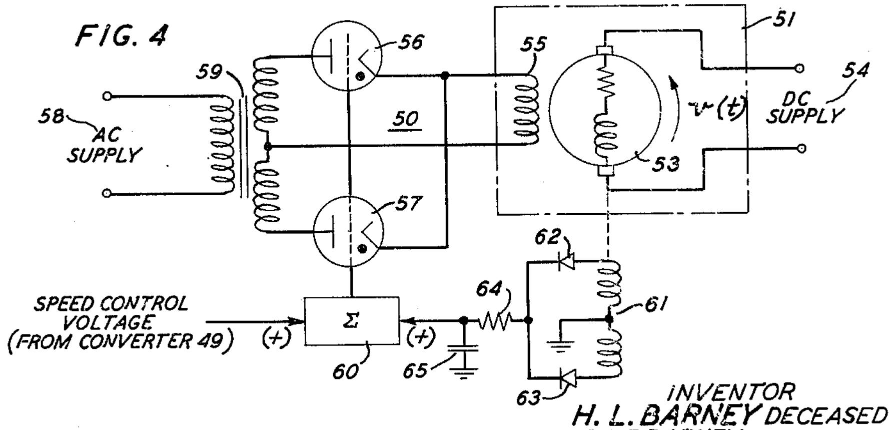
FIG. 4 is a schematic diagram partly in block form showing circuit details of the motor speed control and drive system of FIG. 2.

Motor speed control apparatus 50 may conveniently take the form shown, by way of illustration, in FIG. 4. The armature 53 of a shunt D.-C. motor carries with it the magnetic drum 40 of FIG. 2. Armature 53 is supplied by a source of direct current 54. Current for the field winding 55 is supplied by a pair of grid controlled thyratrons 56 and 57 energized by an alternating current supply 58 via transformer 59. Range voltage from converter 49 (in FIG. 2) is supplied to the one input of a summing device 60 where it is added to a signal proportional to the instantaneous velocity of the armature 53. The summation signal is coupled directly to the grids of thyratrons 56 and 57. The measure of armature speed is obtained, for example, from a tachometer 61 coupled to the armature. It supplies by way of rectifiers 62 and 63 a signal proportional to motor speed. If desired, the motor speed signal may be smoothed by resistor 64 and capacitor 65 before being applied to summing circuit 60. Thus, the armature motor speed is held to a value proportional to the instantaneous delay period of the transmission path and errors between the two intervals are instantaneously corrected by the thyratron action. As 2D increases, the motor control signal $e(t)$ in FIG. 3*b*, increases (i.e., becomes more positive). The summation signal becomes more positive and permits the thyratrons to send more current through field winding 55. Because of the increased field, the motor speed decreases, and the tachometer output decreases, returning the summation signal essentially to its former value, as happens at the error or null point in a feedback amplifier. Hence, the magnetic drum delay is increased to accommodate the increased transmission path delay.

Figure 5:
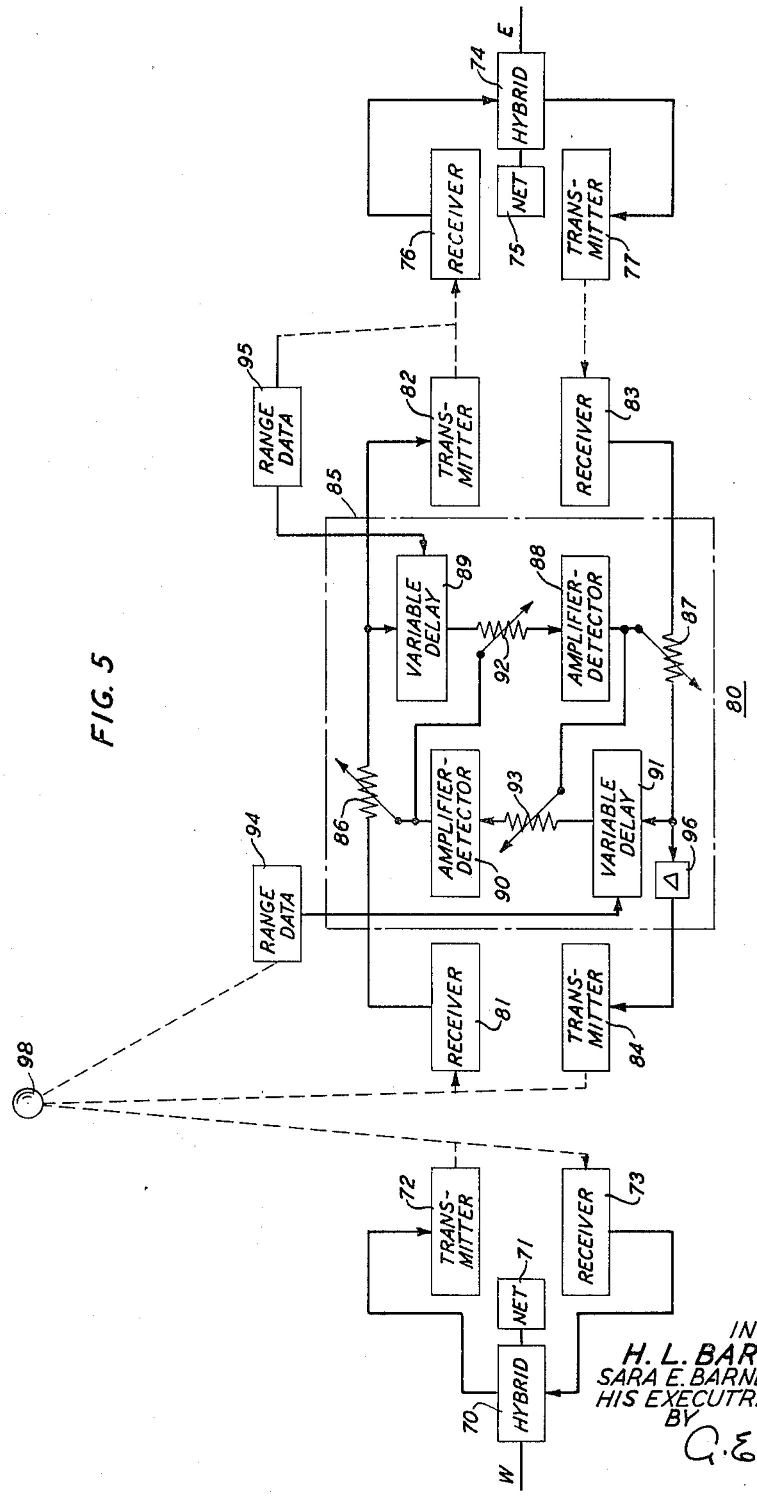
FIG. 5 is a block schematic diagram showing an alternative form of the invention.

The use of terminal echo suppressors lends itself to a connection of several long distance circuits in tandem. One or more of the individual circuits may be satellite circuits, and hence, have the extremely long delay discussed above. FIG. 5 illustrates an arrangement in which the long delay associated with such a circuit is effectively coordinated with echo suppressor action. In the figure, a West substation and an East substation are each coupled to a long distance transmission path by means of terminal station apparatus that includes a suitably terminated hybrid network and a transmitter and receiver. Two long distance paths are shown, one coupling substation W to a repeater 80 and one coupling the substation E to the repeater. Repeater 80, typically includes receiver 81 and transmitter 82 in the W–E path, and receiver 83 and transmitter 84 in the E–W path. The receiver and transmitter in each path are coupled by way of echo suppressor 85. Variolossers 86 and 87 are included in the respective paths to block transmission for periods during which echoes are likely to be present on the lines. Amplifier-detector 88 bridges the W–E path and controls variolosser 87. Its operation is delayed by apparatus 89 to coordinate echo return with the delay interval of the total transmission path delay. Similarly, amplifier-detector 90 bridges the E–W path and controls the attenuation characteristic of variolosser 86. Variable delay 91 coordinates its action with echo returns. To prevent suppression of speech signals by previously stored signals, variolossers 92 and 93 are included in the two bridging paths and are controlled by the oppositely connected amplifier-detector circuits. Variable delay 91, which may be of the rotating drum form described above, is controlled by information derived from radar station 94. Similarly, variable delay 89 is controlled by information derived from radar station 95. By means of the variolossers, smoother switching is achieved and improved break-in is experienced. If desired, a small delay 96 may be introduced in the E–W path after the input to amplifier-detector 90 to permit a build up of loss in variolosser 86 before an echo reaches it. Likewise, the delay element 89 may be reduced from its nominal value of $2(d+d_1)$ by the same small delay in order to allow an initial build up of loss in variolosser 87 before the echo of the W–E signal arrives.

The above-described arrangements are, of course, merely illustrative of the application of the principles of the invention. Numerous other arrangements may be devised by those skilled in the art without departing from the spirit and scope of the invention.

What is claimed is:

1. In a two-way telephone circuit of long and variable path length, an echo suppressor in circuit connection with said telephone circuit, means for continuously determining the momentary transmission delay of said circuit as it changes from moment to moment during transmission thereover, and means responsive to said momentary transmission delay for coordinating the period of operation of said echo suppressor momently with the time of probable echo return.

2. An echo suppressor for a satellite communication system comprising, adjustable means connected in the first of two one-way transmission paths for altering the transmission efficiency of said first path in response to signals developed in the second of said paths, and means for altering the adjustment of said means in said first path momently as the transmission path length of said one-way paths varies from moment to moment during the transmission of message signals thereover.

3. An echo suppressor for a satellite communication system comprising, at least two one-way paths for the transmission of message signals, each of said paths being completed between a pair of stations by way of an earth satellite repeater, adjustable means connected in the first of said one-way paths for altering the transmission efficiency of said first path in response to an applied control signal, means responsive to message signals in the second of said paths for developing a control signal for said adjustable means, and means for altering the adjustment of said means in said first path constantly in accordance with the momentary transmission delay time of both of said one-way paths together as said delay time varies from moment to moment during the transmission of message signals.

4. An echo suppressor for a long distance communication system of variable extent comprising, two one-way transmission circuits, a voice operated device connected across each one of said circuits, means responsive to the operation of each of said voice operated devices for altering the transmission efficiency of the other of said paths, means for continuously measuring the length of at least one of said one-way transmission circuits, and means responsive to said measure of transmission circuit length for inhibiting the operation of said efficiency altering means for a period substantially equal to that required for a wave to travel from said point of connection in one of said paths to the corresponding point in the other.

5. An echo suppressor for a satellite communication system comprising at least two one-way transmission paths between a pair of substations each completed by way of an earth satellite, a voice operated device in circuit connection with each of said paths, means responsive to the operation of each of said voice operated devices for altering the transmission efficiency of the other of said paths, means for continuously determining the momentary transmission delay of said two one-way paths as the path length varies from moment to moment between said pair of substations, and means responsive to said determination for maintaining synchronization between said efficiency altering means and the period during which echoes are encountered by said efficiency altering means.

6. An echo suppressor for satellite communication system as defined in claim 5 wherein said means for determining the momentary transmission delay of said transmission paths includes radar apparatus for continuously tracking said satellite, and means supplied with the time varying range $z(t)$ and the time varying angle of elevation $\theta(t)$ of said satellite, and with constants equal to the velocity of propagation of electromagnetic waves $c$ and the distance A between said substations for computing the momentary transmission delay 2D according to the relation $$2D=2\left(\frac{z+(z^2+A^2-2Az\cos\theta^{1/2}}{c}\right)$$

7. An echo suppressor for a satellite communication system as defined in claim 5 wherein said means for altering the transmission efficiency of said paths comprises a switch in series connection with each of said paths, each under control of said voice operated device in circuit connection with the other one of said paths.

8. An echo suppressor for a satellite communication system as defined in claim 5 wherein said means for altering the transmission efficiency of said paths comprises a variable impedance in circuit connection with each of said paths, each under control of said voice operated device in circuit connection with the other one of said paths.

9. An echo suppressor for a satellite communication system as defined in claim 5 wherein said means for altering the transmission efficiency of said paths comprises a variable gain amplifier in series connection with each of said paths, each under control of said voice operated device in circuit connection with the other one of said paths.

10. In a system for suppressing echoes in a signaling circuit that includes two one-way transmission paths whose lengths vary from moment to moment during signaling, the combination that comprises, signal operated means in circuit connection with each of said paths, means responsive to the operation of each of said signal operated means for altering the transmission efficiency of the other of said paths, and means responsive to the instantaneous transmission path length of at least one of said one-way paths as it changes from moment to moment during signaling for adjusting the operation of said signal operated means momently whereby the efficiency of the other path is altered for a period substantially co-extensive with the period of echo signal return.

11. An echo suppressor for a satellite communication system comprising first variable impedance means connected in the first of two one-way transmission paths for altering the transmission efficiency of said first path, second variable impedance means connected in the second of said one-way transmission paths for altering the transmission efficiency of said second path, first amplifier-detector means connected in the first of said one-way paths for controlling the impedance character of said second variable impedance means in response to signals detected in the first of said paths, second amplifier-detector means connected in the second of said one-way paths for controlling the impedance character of said first variable impedance means in response to signals detected in the second of said paths, means for continuously computing the momentary transmission delay of said first and said second transmission paths together, means responsive to said momentary transmission delay for coordinating the period of control of said first amplifier-detector to coincide with the period of expected echo return at said second variable impedance, third variable impedance means connected serially between said coordinating means and said first amplifier-detector means, and means responsive to signals detected by said second amplifier-detector means for controlling the impedance characteristic of said third variable impedance means.

References Cited by the Examiner

UNITED STATES PATENTS

| | | | |
|---|---|---|---|
| 2,132,180 | 10/38 | Mitchell | 179—170.6 |
| 2,257,806 | 10/41 | Mitchell | 179—170.6 |
| 2,964,598 | 12/60 | Parker | 179—170.2 |
| 2,990,457 | 6/61 | Hall et al. | 179—170.2 |

ROBERT H. ROSE, *Primary Examiner.*

UNITED STATES PATENT OFFICE

CERTIFICATE OF CORRECTION

Patent No. 3,206,559 September 14, 1965

Harold L. Barney, deceased, by
Sara E. Barney, executrix

It is hereby certified that error appears in the above numbered patent requiring correction and that the said Letters Patent should read as corrected below.

Column 8, lines 22 and 23, the equation should appear as shown below instead of as in the patent:

$$2D=2\left(\frac{z+(z^2+A^2-2Az\cos\theta)^{1/2}}{c}\right)$$

Signed and sealed this 26th day of April 1966.

(SEAL)
Attest:

ERNEST W. SWIDER
Attesting Officer

EDWARD J. BRENNER
Commissioner of Patents